United States Patent Office 3,365,275
Patented Jan. 23, 1968

3,365,275
POLYHYDROPOLYBORATES AND PROCESSES
FOR PREPARING THEM
Earl L. Muetterties, West Chester, Pa., assignor to E. I. du Pont de Nemours and Company, Wilmington, Del., a corporation of Delaware
No Drawing. Filed May 31, 1962, Ser. No. 199,573
10 Claims. (Cl. 23—204)

This invention reltes to new compounds containing boron and to methods for preparing the compounds.

Boron compounds, principally salts of boric acid, have been in commercial use for many years. Recently other boron compounds, e.g., low molecular weight boron hydrides, have achieved technical importance in applications employing oxidizing and reducing agents. There are many potential applications, however, for which the available boron compounds are unsuited because of hydrolytic, oxidative or other types of instability. To illustrate, diborane, chlorodiborane, pentaborane(9) and trialkylboron compounds are spontaneously flammable in air. Diborane, pentaborane(9), chlorodiborane, boron trichloride, iododecaborane(14), and most other boron halides are hydrolyzed rapidly in water or alcohol. Even the most stable known borohydride, i.e., decaborane(14), is hydrolyzed at a moderate rate in water. Known ionic borohydrides, e.g., tetrahydroborates ($NaBH_4$, and the like), are hydrolyzed at a rapid rate at 100° C.

A broad class of boron compounds has now been prepared which show good hydrolytic and oxidative stability.

The novel boron compounds of this invention are polyhydropolyborates which consist of (1) an anion-forming group of 20 conjoined boron atoms and 18 hydrogen atoms each bonded to boron, and (2) a cation which is hydrogen, hydronium, a metal, a metal-ammine complex of the Werner type, quaternary ammonium, aryldiazonium, S-substituted sulfonium and P-substituted phosphonium. The compounds are defined also by the following formula:

$$M_a(B_{20}H_{18})_b \quad (1)$$

where M is hydrogen ($H^+$) or, in its hydrated form, hydronium ($H_2O^+$), a metal, a metal-ammine, $R_4N^+$, $ArN \equiv N^+$, $R_3S^+$, and $R_4P^+$, where R represents an organic group and Ar represents an aryl group; $a$ and $b$ are the smallest whole numbers which satisfy the following equation:

$$b = \frac{a \times \text{valence of M}}{2} \quad (2)$$

The compounds of the invention are prepared by oxidizing a decahydrodecaborate($2^-$), i.e., a compound containing the anion $B_{10}H_{10}^{-2}$. The resulting oxidized product can be contacted with a reactant containing the desired cation M and a compound of Formula 1 is isolated from the reaction mixture. Processes for obtaining the compounds of the invention are described more fully in later paragraphs.

The compounds of Formula 1 are composed of two principal components which are represented by M and ($B_{20}H_{18}$). Each of these groups will be discussed separately.

THE COMPONENT M

The component M can consist of one element or more than one element. To simplify the discussion, this component will also be referred to as a group. The group is ionically bonded to the $B_{20}H_{18}$ component and the primary function of the group is to provide the positive ionic charges needed to form a complete compound. The component M is a member of the group described previously for Formula 1 and each member of the group bears one or more positive ionic charges, i.e., each member has a positive valence of at least one. The members of the group have the common property of forming cations in aqueous solution.

In its simplest form M is hydrogen, i.e., $H^+$, which in aqueous solution is usually associated with one or more molecules of water to form a hydrated ion, e.g., the hydronium group ($H_3O^+$).

The group M can also be derived from any metal. The metals according to the Periodic Table in Deming's "General Chemistry," 5th ed., Chapter II, John Wiley & Sons, Inc., and in Lange's "Handbook of Chemistry," 9th ed., pp. 56–57, Handbook Publishers, Inc. (1956) are the elements of Groups I, II, VII, III–B, IV–B, V–B, VI–B, VII–B, and the elements of Groups III–A, IV–A, V–A, and VI–A which have atomic numbers above 5, 14, 33, and 52, respectively. The metals can be light or heavy metals. To illustrate, M can be lithium, sodium, potassium, cesium, beryllium, barium, lanthanum, manganese, iron, cobalt copper, zinc mercury, aluminum, thallium, tin, lead, silver or any other metal. Preferred metals are those whose valences are 1–3, inclusive.

An especially preferred group of metals from which M can be derived consists of elements of Groups I–A, II–A, I–B and II–B having atomic numbers up to and including 80. Most preferred metals are the alkali and alkaline earth metals, i.e., lithium, sodium, potassium, rubidium, cesium, beryllium, magnesium, calcium, strontium, and barium.

The group M can be a combination of a metal with ammonia or an amine, to form a Werner-type coordination group usually referred to as metal-ammines. Examples of cations of this type are as follows:

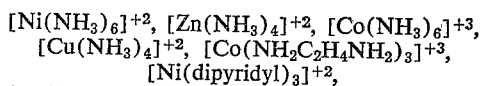
$[Ni(NH_3)_6]^{+2}$, $[Zn(NH_3)_4]^{+2}$, $[Co(NH_3)_6]^{+3}$,
$[Cu(NH_3)_4]^{+2}$, $[Co(NH_2C_2H_4NH_2)_3]^{+3}$,
$[Ni(dipyridyl)_3]^{+2}$, and the like.

The component M can be a group having the formula $R_4N^+$, $R_3S^+$ or $R_4P^+$, where R is an organic group bonded to nitrogen, sulfur or phosphorus. The R substituents are not critical features of these cation groups. Preferably R, for reasons of availability of reactants, contains at most 18 carbon atoms and can be alkyl, alkenyl, cycloalkyl, cycloalkenyl, aryl, alkaryl, aralkyl, cyanoalkyl, hydroxyalkyl or haloalkyl. To illustrate, R can be methyl, propyl, 2-ethylhexyl, octadecyl, allyl, cyclohexyl, cyclohexenyl, phenyl, naphthyl, anthryl, cyclohexylphenyl, diphenylyl, benzyl, chloroethyl, ω-cyanoamyl, β-hydroxyethyl, p-hydroxyphenyl, and the like. In an especially preferred group, R is an aliphatically saturated hydrocarbon, i.e., a hydrocarbon free of olefinic and acetylenic bonds, of up to 12 carbons, e.g., ethyl, butyl, isobutyl, octyl, dodecyl, methylcyclohexyl, tolyl, ethylphenyl, and the like.

The group M can be aryldiazonium, i.e., a group of the formula $ArN_2^+$, where Ar represents an aryl group, preferably a hydrocarbon aryl group of at most 12 carbons, e.g., phenyl, tolyl, xylyl, naphthyl, diphenylyl, and the like.

The valence of the group (or cation) M will be between 1 and 3, i.e., M can have a valence of 1, 2 or 3. In most cases the valence of M will be 1 or 2. The group of compounds in which the valence of M is at most 2 are obtained from readily available reactants and thus form a preferred group.

THE GROUP ($B_{20}H_{18}$)

The novel and characterizing feature of the compounds of the invention is the polyhydropolyborate group $(B_{20}H_{18})^{-2}$. The group is represented generically as having a negative ionic charge of 2 and the group, therefore, behaves in chemical reactions as a divalent anion. The group chemically is exceptionally stable. The boron cage is not easily decomposed by hydrolysis, oxidation or reduction and it is resistant to thermal decomposition. The group is unchanged in simple metathetic reactions, a property which allows the preparation of a broad range of salts in which the cation is represented by M, as defined earlier. The group $(B_{20}H_{18})^{-2}$ undergoes electrophilic substitution reactions in a manner which resembles the behavior of carbocyclic aromatic compounds, e.g., benzene and naphthalene, to obtain compounds in which 1 to 18 hydrogens bonded to boron are replaced by monovalent substituents (organic and inorganic). The behavior of the boron-containing group is particularly surprising in view of the inorganic composition of the group. The stability of the group permits the preparation of a wide range of novel boron-containing compositions.

CHARACTERISTICS OF THE COMPOUNDS

The compounds are generally crystalline solids with the high-melting points which are characteristic of salts. They are stable under conventional storage conditions and can be kept for prolonged periods without decomposition.

The acid of the divalent anion and salts of colorless cations derived from the acid are yellow in color. The acid and salts are generally soluble in hydroxylated solvents, e.g., water, alcohol, and the like, to form intensely yellow solutions. These compounds show characteristic and identifying absorption bands in the infrared spectrum at approximately the following wave-lengths (expressed as microns): 11.3, medium; 11.5, strong; 12.1, strong; 12.8, medium; 13.4, strong; 13.7, medium shoulder; 14.4, strong; and 15.0, strong. Shifts in the characteristic bands can occur through the influence of the cation in the compound and some variation in the above values may, therefore, be noted.

The following examples illustrate the compounds of the invention:

$Li_2B_{20}H_{18}$, $K_2B_{20}H_{18}$, $MgB_{20}H_{18}$, $CaB_{20}H_{18}$, $SrB_{20}H_{18}$
$BaB_{20}H_{28}$, $[Cr(H_2O)_6]_2(B_{20}H_{18})_3$, $Mn(H_2O)_6B_{20}H_{18}$
$Fe(H_2O)_6B_{20}H_{18}$, $Co(H_2O)_6B_{20}H_{18}$, $Ni(H_2O)_6B_{20}H_{18}$
$ZnB_{20}H_{18}$, $CdB_{20}H_{18}$, $HgB_{20}H_{18}$, $SnB_{20}H_{18}$, $PbB_{20}H_{18}$
$Zn(NH_3)_4B_{20}H_{18}$, $[Co(NH_3)_6]_2(B_{20}H_{18})_3$
$Cu(NH_3)_4B_{20}H_{18}$, $[(CH_3)_3S]_2B_{20}H_{18}$, $[(C_4H_9)_4P]_2B_{20}H_{18}$
$[(C_2H_5)_4N]_2B_{20}H_{18}$, $[(C_6H_5CH_2)(CH_3)_3N]_2B_{20}H_{18}$
$[C_2H_5(CH_3)_3N]_2B_{20}H_{18}$, $(C_6H_5N=N)_2B_{20}H_{18}$
$(CH_3C_6H_4N=N)_2B_{20}H_{18}$, $H_2B_{20}H_{18}$, $(H_3O)_2B_{20}H_{18}$ and the like.

PREPARATION OF THE COMPOUNDS

The compounds of Formula 1 are prepared by oxidizing a compound of the formula $$M_{a'}(B_{10}H_{10})_{b'} \qquad (3)$$

where M is a cation, i.e., a group which forms a positively charged ion in $H_2O$, preferably having a valence of 1–3 and $a'$ and $b'$ are defined as the smallest whole numbers which satisfy the equation:

$$2b' = a' \times \text{valence of M} \qquad (4)$$

The compounds of Formula 3 which are employed as reactants are not commonly known and preparation of representative compounds is described in the examples. Any decahydrodecaborate($2-$) can be employed, i.e., compounds in which M is any group which can form a cation in water, are operable. For reasons of availability and cost, it is preferred to use decahydrodecaborates of Formula 3 in which M is hydrogen, hydronium, ammonium, substituted ammonium, an alkali metal or an alkaline earth metal. Specific illustrations of the classes of preferred reactants are $H_2B_{10}H_{10}$ and its hydrates, $Na_2B_{10}H_{10}$, $Cs_2B_{10}H_{10}$, $K_2B_{10}H_{10}$, $Li_2B_{10}H_{10}$, $BaB_{10}H_{10}$, $CaB_{10}H_{10}$, $MgB_{10}H_{10}$, $(NH_4)_2B_{10}H_{10}$, $[(CH_3)_4N]_2B_{10}H_{10}$, $[(C_2H_5)_3NH]_2B_{10}H_{10}$, $[(CH_3)_2NH_2]_2B_{10}H_{10}$, and the like. Hydrates of the salts can also be employed.

Oxidation of the decahydrodecaborate reactant is accomplished either chemically or electrolytically.

In chemical oxidation the oxidizing reagent or oxidant is a compound having as a characteristic component a metal of variable valence, which metal is in its highest valence state, said compound having an oxidation-reduction potential in acid solution of about $-1.33$ to about $-1.61$ volts. The oxidation-reduction potential of a compound is a recognized and measurable property for which values are found in readily available texts, e.g., "Oxidation Potentials," by W. G. Latimer, 2nd ed., Prentice-Hall, New York (1952), particularly p. 344. Examples of classes of compounds which are operable in the process are dichromates, aurates, higher oxides of lead, manganic salts, permanganates, higher oxides of bismuth and salts of tetravalent cerium.

The chemical oxidation process is conducted by simple and uncomplicated procedures in conventional equipment. A solvent is generally employed which preferably is hydroxylated, e.g., methanol, water, and the like. Water is most conveniently used and it is therefore the preferred solvent.

The ratio in which the reactants are employed is not a critical factor for operability. However, the use of an excess of oxidant may lead to a decrease in yield of the desired product. It is preferable to employ at most two oxidation equivalents of the oxidant (based on the metal) per mole of $B_{10}H_{10}^{-2}$ salt or acid used in the process. The preferred mole ratio of oxidant to polyhydropolyborate can be determined by methods described in Handbook of Chemistry and Physics, 38th ed., p. 1588, Chemical Rubber Publishing Co. (1956).

Pressure is not a critical factor in the process and atmospheric pressure is normally used. However, if desired, pressures higher or lower than atmospheric can be employed. The temperature of the reaction is also not critical. Normally, the reaction is conducted at prevailing atmospheric temperature but temperatures as low as 0° C. and as high as 100° C. can be employed. Preferred temperatures of operation lie between about 10° and 75° C.

The reaction proceeds rapidly and a measurable quantity of product is obtained within a short time. Normally the reactants are maintained in contact for a sufficient period to assure maximum yield. The time of reaction can range from a few minutes to 24 hours or more.

In the operation of the process it is preferable (although not essential) to add the oxidant to the decaborate to reduce the vigor of the reaction and to obtain the maximum yield of desired product. Normally, therefore, the reaction vessel is charged with the solvent and the decahydrodecaborate. The chemical oxidant, which is conveniently handled in solution, is added gradually to the vessel at a rate which provides a controllable reaction. After all of the oxidant has been added, the reaction mixture can be stirred for a short period and a solution containing the desired cation (M) is added. The polyborate salt frequently precipitates at this point but, in the event precipitation does not occur, the solution is evaporated to a volume at which the solid separates. The product is purified by conventional procedures to obtain a salt of the divalent anion, $B_{20}H_{18}^{-2}$.

The electrolytic oxidation process is conducted by well known procedures which are described in texts, e.g., see Glasstone, "Introduction to Electrochemistry," Chapter XV, D. Van Nostrand Co., 5th ed. (1951). The decahydrodecaborate salt is dissolved in an aprotic solvent to provide a solution of satisfactory conductivity to which sufficient current is applied to release gas (hydrogen) at the cathode. An aprotic solvent is a liquid which has no tendency to release or to accept protons (see Moeller, "Inorganic Chemistry," p. 312 (1954), Wiley & Sons, Inc.).

The solvents employed in the process are usually polar organic liquids, e.g., nitriles, tertiary nitrogen bases, N,N- disubstituted amides, and the like. Examples of suitable solvents are acetonitrile, pyridine, N,N-dimethylaniline, dimethylformamide, and combinations of these liquids. A current of at least one ampere and one volt is usually employed. These conditions are not critical and they are used solely to illustrate a satisfactory method of operation. The process is conducted conveniently at atmospheric temperature, i.e., about 25° C. although lower and higher temperatures can be used, e.g., as low as 0° C. or as high as 100° C. The preferred temperature range lies between 10° and 60° C.

The salt is isolated in the electrolytic oxidation process by methods described for the chemical oxidation process.

*Metathetic reactions.*—Compounds of Formula 1, wherein M includes the group of cations as defined for Formula 1 are obtained by simple metathetic reactions. To illustrate, an aqueous solution of a compound of Formula 1, where M is $(CH_3)_4N^+$ is contacted with a strong acid or with a strongly acidic cation exchange resin to obtain a free acid, i.e., a compound of Formula 1 in which M is H. The acid, generally in solution, is reacted with oxides of metals, hydroxides of metals, salts of metals (both organic and inorganic), quaternary nitrogen bases, sulfonium hydroxides or halides, phosphonium hydroxides or halides, aryldiazonium hydroxides or halides, and similar types of compounds to obtain products of Formula 1 which have the desired cation M. In a process employing an ion-exchange resin, strongly acidic resins of the sulfonic acid variety are preferred because of availability, e.g., "Amberlite" IR–120–H and "Dowex" 50. The acid, so obtained in aqueous solution, can be reacted with nitrates, chlorides, bromides, acetates, benzoates and similar salts of metals or other bases to obtain salts of Formula 1.

To illustrate, an aqueous solution of $Cs_2B_{20}H_{18}$ is passed through a column packed with a commercial cross-linked polyarylsulfonic acid to obtain in aqueous solution the acid $H_2B_{20}H_{18}$. The aqueous solution is evaporated under reduced pressure to obtain the crystalline acid generally as a solid hydrate having up to 12 or more molecules of water. The number of molecules of water present in the crystalline hydrated acid is not a critical factor in obtaining the free acid. However, for maximum stability in storage, a crystalline acid having at least 4 moles of water of hydration per mole of acid is preferred.

The acid is, in fact, most conveniently handled as a hydrate. In the hydrated form part of the water of hydration is considered to be associated with each ionizable proton and the crystalline acids can be represented as having hydrated protons, e.g., $(H_3O)_2B_{20}H_{18}$, $(H_3O)_2B_{20}H_{18} \cdot 2H_2O$
$(H_3O)_2B_{20}H_{18} \cdot 4H_2O$
$(H_3O)_2B_{20}H_{18} \cdot 7H_2O$

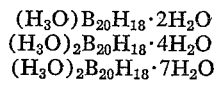
$(H_3O)_2B_{20}H_{18} \cdot 10H_2O$, and the like.

For many purposes, it is not necessary to isolate the acid from solution. Solutions of the acid can be employed directly, for example, in metathetic reactions.

Metal salts of the invention can be prepared by neutralization of the acids, obtained as described above in aqueous or alcohol solution with an aqueous solution or suspension of an inorganic base, e.g., an alkali or alkaline earth metal hydroxide. The resulting aqueous solution of the metal salt of the $(B_{20}H_{18})^{-2}$ anion is concentrated by evaporation of water or alcohol until the salt crystallizes out. In many cases the salt may precipitate during its preparation and evaportaion of the solution is not necessary. The crystalline salt is dried under reduced pressure, e.g., 0.1 mm. of mercury, and moderately elevated temperature, e.g., 50–100° C. The metal salts frequently contain water of hydration which can be removed by heating for several hours at a temperature of about 200° C. under low pressure, e.g., 0.1 mm. of mercury or lower. Specific examples of salts which can be obtained by the process described above are: $Na_2B_{20}H_{18}$, $K_2B_{20}H_{18}$, $Li_2B_{20}H_{18}$, $Cs_2B_{20}H_{18}$, $MgB_{20}H_{18}$, $BaB_{20}H_{18}$, $CaB_{20}H_{18}$, and $SrB_{20}H_{18}$.

Water-insoluble heavy metal salts of the acids can be prepared by adding a water-soluble heavy metal salt, e.g., silver nitrate or mercuric nitrate, to an aqueous solution of $H_2B_{20}H_{18}$, whereupon the heavy metal salt of the anion precipitates out as a light colored solid. The salts formed in this procedure are usually anhydrous. Examples of heavy metal salts which can be prepared by this method are: $HgB_{20}H_{18}$, $PbB_{20}H_{18}$, and $Ag_2B_{20}H_{18}$. The procedure is generic to the preparation of metal salts of the compounds of the invention.

Nitrates, carbonates, chlorides or oxides of metals can be used to prepare the salts by the methods described earlier.

Light-sensitive salts, e.g., the silver salt, are preferably prepared under conditions providing minimum exposure to light although exclusion of light is not essential for operability.

Compounds of Formula 1, where M is an alkali or alkaline earth metal, e.g., Na, K, Cs, Ca, Ba, Mg, and Sr, can undergo simple metathetic reactions with other salts to effect an exchange of cations. Thus, $Na_2B_{20}H_{18}$ or $K_2B_{20}H_{18}$ can be reacted in aqueous solution with benzenediazonium hydroxide, trimethylsulfonium iodide, tetrabutylphosphonium chloride, and the like, to form compounds of Formula 1 having benzenediazonium, trimethylsulfonium, tetrabutylphosphonium, and the like, as cations. These illustrations are not limiting and they demonstrate the breadth of metathetic reactions which can be used.

Compounds of the invention in which the group M is a metal, particularly a transition metal, or a Werner-type complex, frequently contain solvent of crystallization when isolated by conventional methods. The solvent, e.g., water, can be bound loosely in the lattices of the crystals or it can be associated by stronger bonds with the metal cation or Werner-type complex cation. Solvent of crystallization, entrapped in crystal lattices, is removed easily by well-known procedures, e.g., heating under reduced pressure. Solvent of crystallization which is associated with the cation is more difficult to remove, and for most applications, it is not necessary to remove completely this type of bound solvent. Salts containing solvent of crystallization, in particular, salts with water of crystallization, are within the scope of the compounds of this invention.

The products of the invention and processes for obtaining them are illustrated in the following examples. The preparation of a representative compound of the type $M_{a'}(B_{10}H_{10})_{b'}$, which is employed as a principal reactant, is also illustrated.

*Example A*

(A) *Preparation of bis(dimethyl sulfide)decaborane (12).*—A reaction vessel having a capacity of about 365 g. of water is charged with 0.79 g. of decaborane(14), cooled in liquid nitrogen, and then evacuated to a pressure of 10 microns of mercury. Approximately 21 g. of dimethyl sulfide is condensed onto the decaborane in the reaction vessel. The reaction vessel is closed, allowed to warm to room temperature and stand for 4 days. During this time 6.6 millimoles of hydrogen is evolved. The reaction vessel is opened and excess dimethyl sulfide is removed by distillation, leaving a practically quantitative yield of white solid residue of $B_{10}H_{12} \cdot 2(CH_3)_2S$. The compound is recrystallized from ethyl acetate and it melts at 122–124° C. The compound is called bis(dimethyl sulfide)decarborane(12).

The above procedure is equally operable with other organic sulfides.

(B) *Preparation of* $M_2B_{10}H_{10}$ *(where M is* $NH_4$*).*—Bis(dimethyl sulfide)decaborane(12) (8.5 g.) is mixed with 50 ml. of liquid ammonia and stirred in a roundbottom reaction vessel for 1 hour with the vessel being cooled to a temperature of about −50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of $(NH_4)_2B_{10}H_{10}$.

*Example I*

(A) A reaction vessel is charged with 100 ml. of water and 1.46 g. of $(NH_4)_2B_{10}H_{10}$. The mixture is stirred and a solution of 5.4 g. of $Ce(NH_4)_2(NO_3)_6$ in 80 ml. of water is added gradually. Evolution of gas occurs and a deep blue-violet solution forms. A concentrated aqueous solution of $(CH_3)_4NCl$ is added to the reaction mixture with stirring and in sufficient amount to precipitate completely a violet-colored solid. The solid is separated by filtration and it is purified by crystallization from hot water to yield the yellow compound, bis(tetramethylammonium) octadecahydroeicosaborate(2−).

The compound is soluble in acetonitrile, hot methanol and hot water. The identity of the product is confirmed by elemental analysis.

*Analysis.*—Calcd. for $[(CH_3)_4N]_2B_{20}H_{18}$: C, 25.10; H, 11.06; N, 7.32; B, 56.54. Found: C, 26.28; H, 11.49; N, 7.55, 7.80; B, 54.28.

The identity of the compound is further confirmed by measuring the number of moles of hydrogen obtained from the boron moiety $(B_{20}H_{18})$ upon complete hydrolysis to boric acid. The values for moles $H_2$, obtained per mole $[(CH_3)_4N]_2B_{20}H_{18}$, are as follows: Calcd., 40.0; found, 39.904 and 40.086.

(B) The above process is repeated employing the same quantity of reactants but the quantity of gas which evolves is measured. In two hours a total of 20 ml. of gas is released in the process. Aqueous $(CH_3)_4NOH$ solution is added to the reaction mixture to precipitate $[(CH_3)_4N]_2B_{20}H_{18}$. Elemental analysis of the product yields the following data: C, 23.92; H, 10.93; N, 7.04, 6.97; B, 56.88.

The infrared spectrum of $[(CH_3)_4N]_2B_{20}H_{18}$ in a Nujol mull shows many absorption bands of which the most representative are as follows (expressed as microns): 3.99, very strong; 4.05, very strong; 6.76, strong; 7.10, medium; 7.80, medium; 10.57, strong; 11.26, medium; 11.50, strong; 12.12, strong; 12.88, medium; 13.41, strong; 13.70, medium, shoulder; 14.41, strong, and 15.08, strong.

The ultraviolet spectrum of $[(CH_3)_4N]_2B_{20}H_{18}$ in solution in acetonitrile shows major absorption maxima at 292 m$\mu$ and 233 m$\mu$; the extinction coefficients are 8260 and 18,000, respectively.

X-ray single crystal data show that the tetramethylammonium salt has the monoclinic structure. The lattice constants for this salt are as follows: $\alpha \sin \beta = 12.06$; $b = 15.85$, and $c = 13.50$. The cell weight constant corresponds to 4 molecules of $[(CH_3)_4N]_2B_{20}H_{18}$ per unit cell.

The magnetic susceptibility of solid $[(CH_3)_4N]_2B_{20}H_{18}$ is $-0.64 \times 10^{-6}$ E.M.U./g., showing that the compound is diamagnetic.

The electrical conductivity of the above salt is determined in aqueous solution at various concentrations and from the data a plot is made of the equivalent conductance of the solution as a function of the square root of the concentration of the salt. The data show that the compound is a 1–2 electrolyte.

*Example II*

A reaction vessel is charged with 7.7 g. of $(NH_4)_2B_{10}H_{10}$ and 350 ml. of water. The mixture is stirred and there is added gradually a solution consisting of 28 g. of $Ce(NH_4)_4(SO_4)_4 \cdot 2H_2O$, 250 ml. of water and 75 ml. of concentrated $H_2SO_4$. The mixture is stirred overnight (ca. 15–20 hours) and it is then filtered. Aqueous $(CH_3)_4NOH$ solution is added to the clear filtrate. The yellow precipitate which forms is separated and recrystallized from hot water to obtain pure $[(CH_3)_4N]_2B_{20}H_{18}$. Elemental analysis yields the following data: C, 24.13; H, 11.34; B, 56.39.

Examples I and II illustrate the process of the invention in which the mole ratio of the $Ce^{+4}$ reactant to the $B_{10}H_{10}^{-2}$ reactant is about 1:1. The yields of desired $B_{20}H_{18}^{-2}$ under these conditions are generally not over 50% of the theoretical yield.

*Example III*

A reaction vessel is charged with 15.4 g. of $(NH_4)_2B_{10}H_{10}$ and 250 ml. of water. The mixture is stirred and a solution consisting of 126.4 g. of $Ce(NH_4)_4(SO_4)_4 \cdot 2H_2O$, 1000 ml. of water and 50 ml. of concentrated $H_2SO_4$ is added slowly over a period of 3 hours. During the addition the orange solution containing the $Ce^{+4}$ ion is decolorized and a white solid precipitates. The precipitate is separated and it is shown by infrared analysis to be $Ce_2(SO_4)_3$.

The filtrate is stirred and a solution consisting of 25 g. of $(CH_3)_4NOH$ in 100 ml. of $H_2O$ is added. A voluminous white precipitate forms which is separated by filtration. The solid is recrystallized from an acetonitrile-water solution to obtain 17.7 g. of yellow crystalline $[(CH_3)_4N]_2B_{20}H_{18}$. Elemental analysis yields the following average data: C, 24.46; H, 10.96; N, 7.23.

Example III illustrates the oxidation process in which the mole ratio of the $Ce^{+4}$ reactant to the $B_{10}H_{10}^{-2}$ reactant is about 2:1. Under these conditions high yields of $B_{20}H_{18}^{-2}$ salts are obtained.

*Example IV*

A reaction vessel is charged with 100 ml. of water, 3 ml. of concentrated $H_2SO_4$ and 4.62 g. of $(NH_4)_2B_{10}H_{10}$. The mixture is stirred and a solution of 1.47 g. of $K_2Cr_2O_7$ in 50 ml. of water and 15 ml. of concentrated $H_2SO_4$ is added gradually at prevailing atmospheric temperature (about 25° C.). The color of the solution, which initially is yellow, changes through several shades to the greenish color of the trivalent chromium ion. The mixture is stirred vigorously for a short time and some gas evolves. An aqueous solution of $(CH_3)_4NOH$ is added and a flocculent precipitate forms. The precipitate, which is $[(CH_3)_4N]_2B_{20}H_{18}$, is separated and recrystallized from aqueous acetonitrile. There is obtained about 1 g. of bis(tetramethylammonium) octadecahydroeicosaborate(2−).

*Example V*

Using the procedure described in Example IV, a solution of 3.08 g. of $(NH_4)_2B_{10}H_{10}$ in 40 ml. of water is reacted with a solution of 0.63 g. of $KMnO_4$ in 40 ml. of water and 2 ml. of concentrated $H_2SO_4$. The color of the solution changes from purple to colorless and gas is evolved. An aqueous solution of $(CH_3)_4NOH$ is added to the reaction mixture and the precipitate which forms is purified as described earlier to yield about 0.1 g. of $[(CH_3)_4N]_2B_{20}H_{18}$.

*Example VI*

A solution is prepared containing 1.0 g. of $(NH_4)_2B_{10}H_{10}$ in a small quantity of water. To this solution there is added 5 ml. of a suspension composed of 3 g. of $PbO_2$, 30 ml. of water and 10 ml. of concentrated $H_2SO_4$. Vigorous evolution of gas occurs and the color of the lead oxide changes from black to brown. An aqueous solution of $(CH_3)_4NCl$ is added and the precipitate which forms is separated. It is recrystallized as described in previous examples to obtain $[(CH_3)_4N]_2B_{20}H_{18}$.

Examples I–VI, inclusive, illustrate the process of chemical oxidation to obtain the compounds of the invention.

Example VII

A reaction vessel, fitted with two platinum electrodes, is charged with a solution consisting of 10 g. of $(NH_4)_2B_{10}H_{10}$, 300 ml. of acetonitrile and 100 ml. of pyridine. The solution is electrolyzed for 2 hours at 20 volts and an initial current of 1.4 amperes. The current gradually decreases to 0.8 ampere as the electrolysis progresses. A coating of an orange-colored gum forms on the anode and a gas is evolved at the cathode. The solution changes in color, becoming light yellow at first, then a deep yellow and finally a deep orange. After completion of the electrolysis step, water and excess $(CH_3)_4NOH$ and $(CH_3)_4NCl$ are added to the solution. No precipitate forms and the solution is evaporated under reduced pressure to yield an orange solid. The solid is crystallized from hot water and from methanol to give yellow crystalline $[(CH_3)_4N]_2B_{20}H_{18}$. Data from elemental analysis are: C, 25.39, 25.44; H, 11.37, 11.60; N, 6.99, 6.73; B, 56.22.

Example VII illustrates the process to obtain the compounds of the invention by electrolytic oxidation.

Example VIII (A) A solution of $[(CH_3)_4N]_2B_{20}H_{18}$ in methanol-water is passed through a column packed with a commercial acidic ion-exchange resin of the polysulfonic acid type. The effluent is a solution of the acid $H_2B_{20}H_{18}$, or, expressed in its hydrated form as a hydronium acid, $(H_3O)_2B_{20}H_{18}$. The aqueous solution frequently is used without further processing to prepare salts of the acid.

(B) The solid acid is obtained by evaporating the aqueous solution, prepared as described above, to dryness at very low pressure (less than 0.1 mm. of mercury). The acid, which forms large intensely colored yellow crystals, contains 6 moles of water of hydration, of which 2 moles are considered to be associated with the proton cations. The identity of the compound is confirmed by elemental analysis.

*Analysis.*—Calcd. for $(H_3O)_2B_{20}H_{18} \cdot 4H_2O$: H, 9.36; B, 62.80. Found: H, 8.91; B, 63.65.

The solid yellow crystals of the hydrated acid obtained above are very hygroscopic. They dissolve in water to form a clear yellow solution which, when mixed with an aqueous solution of $(CH_3)_4NOH$, forms the salt $[(CH_3)_4N]_2B_{20}H_{18}$ A study of the acid strength of the dibasic acid in aqueous solution shows that it is a very strong acid, having only one inflection point in the titration curve.

Example VIII illustrates the preparation of the acid, dihydrogen octadecahydroeicosaborate(2−) in the form of its hydrates. Any strong acid or acid ion-exchange resin can be employed to provide an acid environment. To illustrate, the $B_{20}H_{18}^{-2}$ salt can be mixed with an aqueous solution of a strong mineral acid, e.g., sulfuric, hydrochloric, and the like, to obtain the free acid which, in solution, is frequently referred to as $(H_3O)_2B_{20}H_{18}$.

Example IX

A portion of an aqueous solution of the dibasic acid, prepared as described in Example VIII, part (A), is titrated with an aqueous solution of sodium hydroxide until the reaction mixture is neutral (pH=7). The resulting aqueous solution is yellow and its ultraviolet spectrum shows absorption in regions which are characteristic for salts of the $B_{20}H_{18}$ anion.

The yellow solution is evaporated to dryness under reduced pressure (less than 1 mm. of Hg) to obtain crude $Na_2B_{20}H_{18}$ as a tan-colored solid. The compound is purified by crystallization from methanol. The product so obtained contains water of crystallization.

*Analysis.*—Calcd. for $Na_2B_{20}H_{18} \cdot 2H_2O$: B, 68.34; H, 7.07. Found: B, 68.21; H, 7.25.

The compound can, if desired, be obtained free of solvent of crystallization by heating for a time at very low pressure. The molecular weight of the compound $Na_2B_{20}H_{18}$, determined by freezing point depression in aqueous solution gives the following values: 103, 99, 89, 88, i.e., an average mol. wt. of 95; calcd. value: 93.3.

The ultraviolet spectrum of the sodium salt in solution in acetonitrile shows major absorpton maxima at 292 mμ and 233 mμ.

Example X

An aqueous solution of the dibasic acid, obtained as described in Example VIII, part (A), is mixed with an aqueous solution of CsF. The precipitate which forms is separated, washed and dried to obtain $Cs_2B_{20}H_{18}$ containing 1.5 moles of water of hydration. The salt is moderately soluble in water.

*Analysis.*—Calc'd. for $Cs_2B_{20}H_{18} \cdot 1.5H_2O$: Cs, 50.4; B, 41.03. Found: Cs, 50.5; B, 41.93, 41.87.

The infrared spectrum of the above cesium salt in a Nujol mull shows absorption bands as follows (expressed as microns): 3.92, 3.99, 4.05, very strong; 10.51, strong; 11.28, very strong; 11.81, medium, shoulder; 12.05, very strong; 12.61, weak; 13.25, very strong; 13.65, 13.85, medium; 14.40, strong; and 14.88, very strong.

Example XI (A) An aqueous solution of the dibasic acid, obtained as described in Example VIII, part (A), is mixed with an aqueous solution of $AgNO_3$. The quantity of $AgNO_3$ used is equivalent to the amount of acid in the aqueous solution. The precipitate which forms is separated and dried to yield the silver salt of the acid as a hydrate.

*Analysis.*—Calcd. for $Ag_2B_{20}H_{18} \cdot 5H_2O$: Ag, 39.9; B, 40.1. Found: Ag, 40.1; B, 40.15.

(B) The process of part (A) is repeated, employing less than the equivalent amount of $AgNO_3$ in solution. The precipitate which forms became tan-colored during processing. It is, however, substantially pure silver salt, free of water of hydration.

*Analysis.*—Calcd. for $Ag_2B_{20}H_{18}$: Ag, 47.48; B, 43.13. Found: Ag, 47.91; B, 48.06.

In the process of Example XI, the use of excess silver nitrate solution results in reduction of the silver ion with formation of silver metal.

Example XII

A portion of an aqueous solution of the dibasic acid, prepared as described in Example VIII, part (A), is titrated with an aqueous solution of barium hydroxide until the reaction mixture is neutral (pH=7). The resulting solution of $BaB_{20}H_{18}$ is yellow and it shows absorption maxima at 292 mμ and 233 mμ.

The solid salt $BaB_{20}H_{18}$ can be isolated by evaporation of the solution as described in Example IX for the sodium salt.

Example XIII

An aqueous solution of the dibasic acid, prepared as described in Example VIII, part (A), is mixed with an aqueous solution of $(C_6H_5)_3CH_3PI$. The precipitate which forms is separated and recrystallized from benzene-acetonitrile-methanol mixture to obtain long needles of the bis(triphenylmethylphosphonium) salt.

*Analysis.*—Calcd. for $[(C_6H_5)_3CH_3P]_2B_{20}H_{18}$: C, 57.82; H, 6.90; P, 7.85; B, 27.41. Found: C, 57.69; H, 7.30; P, 7.92; B, 27.27.

A second preparation of the compound yields the following elemental analysis: C, 58.28; H, 7.42.

X-ray diffraction data on crystals of the compound show that the crystals are monoclinic where $a=11.96$, $b=15.42$, $c=12.37$ and $\beta=94°$ C. The density is 1.167 and the observed molecular weight is 795 (calcd. value, 789).

Example XIV

A solution of the acid, prepared as described in Example VIII, part (A), is mixed with a hot methanol solution of $(C_6H_5CH_2)_4PBr$. The white precipitate which forms is separated and recrystallized from acetonitrile to yield the white crystalline bis(tetrabenzylphosphonium) salt.

*Analysis.*—Calcd. for $[(C_6H_5CH_2)_4P]_2B_{20}H_{18}$: C, 65.68; H, 7.27; P, 6.04; B, 21.10. Found: C, 61.97; H, 8.01; P, 5.86; B, 20.09.

Example XV

A solution of the acid, prepared as described in Example VIII, part (A), is mixed with an aqueous solution of $(CH_3)_3SI$. The precipitate which forms is separated, dried and purified by crystallization to obtain the bis(tetramethylsulfonium) salt. Elemental analyses are: C, 18.77; H, 9.67.

The process is repeated to obtain a further quantity of the compound for confirmatory analysis.

*Analysis.*—Calcd. for $[(CH_3)_3S]_2B_{20}H_{18}$: C, 18.54; H, 9.33; B, 55.65; S, 16.49. Found: C, 18.93, 18.80; H, 9.80, 9.74; B, 55.16; S, 16.47.

The infrared spectrum of the above trimethylsulfonium salt in the 11–15μ region is similar to the spectrum for $[(CH_3)_4N]_2B_{20}H_{18}$ described in Example I. The ultraviolet spectrum of the trimethylsulfonium salt in solution in acetonitrile shows the same maxima and extinction coefficients as the tetramethylammonium salt.

Examples X–XV, inclusive, illustrate the process of preparing compounds of the invention employing the dibasic acid, $H_2B_{20}H_{18}$, as a reactant. The process is generic to the preparation of a wide range of salts, e.g.,

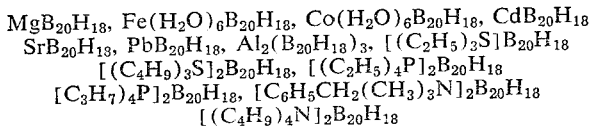

and the like, by neutralization of the acid with a base or salt having the appropriate cation. To illustrate briefly, the acid solution can be reacted with $MgCl_2$, $FeSO_4$, $CsCl_2$, $CdNO_3$, $Sr(OH)_2$, $PbCl_2$, $Al_2(SO_4)_3$, tri-substituted sulfonium iodides, trisubstituted sulfonium hydroxides, tetra-substituted phosphonium bromides, and the like.

Aryldiazonium salts can be obtained by reacting an aqueous solution of the acid with, e.g., an aryldiazonium chloride or hydroxide. To illustrate, an aqueous solution of benzenediazonium chloride is mixed with an aqueous solution of $H_2B_{20}H_{18}$ and the solution is evaporated, if necessary, to a point where the bis(benzenediazonium) octadecahydroeicosaborate(2−) precipitates. Similarly an aqueous solution of tolyldiazonium hydroxide is added in sufficient quantity to an aqueous solution of $H_2B_{20}H_{18}$ to form a neutral solution. The solution is evaporated until the bis(tolyldiazonium) salt separates, i.e.,

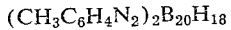

Metal-ammine salts can be obtained by reacting a metal salt of the $B_{20}H_{18}^{-2}$ anion with a metal-ammine salt, e.g., the chloride or nitrate, in solution in ammonium hydroxide. To illustrate, $ZnCl_2$ is dissolved in concentrated aqueous $NH_4OH$ and $Na_2B_{20}H_{18}$ is added to the solution with stirring. The precipitate which forms is $Zn(NH_3)_4B_{20}H_{18}$. Cobalt-ammine salts, copper-ammine salts, and the like are prepared in a similar manner, employing cobalt nitrate and copper chloride in place of zinc chloride. The salts are isolated by filtration and dried by conventional methods.

*Utility.*—The invention provides a broad class of new boron compounds which find applications in many fields.

The compounds of the invention are generically useful as impregnating agents in the preparation of resistors. To illustrate, a section of a cotton string is immersed in a nearly saturated solution of $[(CH_3)_4N]_2B_{20}H_{18}$ in a mixture of acetonitrile and water. The string is withdrawn from the solution and the solvent is removed by drying in air. A free flame is applied to the dried impregnated string and it burns to yield a coherent ash which in size and shape resembles the original string. The residual skeleton is of sufficient coherence to permit embedding in paraffin. The section of residue, so treated, shows a resistance in excess of 15,000 ohms/cm. The residue from a control section of string is very small and shapeless and it cannot be handled.

In the group of compounds which fall within the scope of Formula 1, the component M represents a range of groups which are readily interchangeable by metathetic reactions as described earlier. All of the salts which fall within the scope of Formula 1 can be used to prepare the acid, represented as $H_2B_{20}H_{18}$, in aqueous solution, as $(H_3O)_2B_{20}H_{18}$, by passing aqueous or alcoholic solutions of the salts through an acidic ion-exchange resin as described earlier. The acid (and its hydrates) is a strong acid and it is useful in industrial applications where it is desired to avoid contamination from sulfate, chloride, bromide, chlorate, hosphate, and like strong acid anions. Thus, the acid is useful for etching metals, such as steel, and for rust removal, for pickling, for scale removal and for similar metal processing operations.

The acid, described above, is useful as a catalyst in the preparation of esters, e.g., in the reaction of alcohols and organic carboxylic acids, to improve the yields of the desired esters. The acid of the invention is employed for this purpose in the same manner as p-toluenesulfonic acid, sulfuric acid or alcoholic hydrogen chloride.

Aqueous solutions of the acids are useful as agents for absorbing noxious basic materials from the air, e.g., traces of ammonia, lower alkyl amines, and the like. To illustrate, air contaminated with methylamines is passed through an aqueous solution of $H_2B_{20}H_{18}$ and the amines are removed.

All of the compounds of the invention are generically useful as components of fireworks compositions to impart a pleasing color and sparkle to the display, e.g., $Cs_2B_{20}H_{18}$, $[(CH_3)_3S]_2B_{20}H_{18}$, $[(C_6H_5)_3CH_3P]_2B_{20}H_{18}$, and like salts, such as the strontium, magnesium, cobalt and aryldiazonium salts, can be used in such compositions.

The silver salts, i.e., the compounds of Formula 1, where M is Ag, in the presence of an excess of silver ion, reduce the ion to metallic silver. These compounds are, therefore, useful in the photographic arts and in the preparation of printed circuits. To illustrate, a cellulosic sheet is immersed for a few minutes in an aqueous solution of silver nitrate and dried in air. A solution of a compound of Formula 1, e.g., the tetramethylammonium salt, is applied to the dried impregnated sheet and a deposit of metallic silver forms on the sheet at the points of application. Further, a cellulose sheet is immersed for a few minutes in a solution of a salt of Formula 1, e.g., the cesium salt, and dried in air. A solution of $AgNO_3$ is applied to the dried sheet and a deposit of metallic silver forms on the sheet.

As many apparently widely different embodiments of this invention may be made without departing from the spirit and scope thereof, it is to be understood that this invention is not limited to the specific embodiments thereof excep as defined in the appended claims.

The embodiments of this invention in which an exclusive property or privilege is claimed are defined as follows:

1. A compound of the general formula $$M_a(B_{20}H_{18})_b$$

wherein *a* and *b* are the smallest whole numbers which satisfy the equation $$b = \frac{a \cdot \text{valence of M}}{2}$$

and M is a cation selected from the class consisting of hydrogen, hydronium, cation of a metal having a valence of 1–3 selected from Group I, II, III–B, IV–B, V–B, VI–B, VII–B or VIII of the Periodic Table of elements, cation of a metal having a valence of 1–3 selected from Group III–A, IV–A, V–A, or VI–A of the Periodic Table of elements having atomic numbers above 5, 14, 33, or 52, respectively $[Ni(NH_3)_6]^{+2}$, $[Zn(NH_3)_4]^{+2}$, $$[Co(NH_3)_6]^{+3}$$

$[Cu(NH_3)_4]^{+2}$, $[Co(NH_2C_2H_4NH_2)_3]^{+3}$ $[Ni(dipyridyl)_3]^{+2}$; $ArN\!\!=\!\!N^+$ wherein Ar is a hydrocarbon aryl group of at most 12 carbon atoms, $R_4N^+$, $R_3S^+$, and $R_4P^+$ wherein R contains up to 18 carbon atoms and is a group selected from the class consisting of alkyl, cycloalkyl, alkenyl, cycloalkenyl, aryl, aralkyl, alkaryl, cyanoalkyl, hydroxyalkyl and haloalkyl.

2. A compound of claim 1 in the hydrated form.
3. $H_2B_{20}H_{18}$.
4. A compound of claim 3 in the hydrated form.
5. $[(CH_3)_4N]_2B_{20}H_{18}$.
6. A compound of claim 5 in the hydrated form.
7. $Cs_2B_{20}H_{18}$.
8. A compound of claim 7 in the hydrated form.
9. $(CH_3C_6H_4N_2)_2B_{20}H_{18}$.
10. A compound of claim 9 in the hydrated form.

References Cited

UNITED STATES PATENTS

| | | | |
|---|---|---|---|
| 2,606,183 | 8/1952 | Head et al. | 260—141 |
| 2,756,259 | 7/1956 | Bragdon et al. | 260—567.6 |
| 2,923,703 | 2/1960 | Bruni et al. | 260—141 |
| 3,018,160 | 1/1962 | Miller | 23—14 |
| 3,021,190 | 2/1962 | McElroy et al. | 23—14 |
| 3,108,139 | 10/1963 | Larchar | 260—567.6 |
| 3,148,939 | 9/1964 | Knoth | 23—358 X |

OTHER REFERENCES

Schechter et al.: "Boron Hydrides and Related Compounds," prepared under contract NOa(s) 10992 by Callery Chemical Co. for Dept. of Navy, Bureau of Aeronautics, declassified Jan. 5, 1954, p. 59.

Lyscomb: "Proceeding of the National Academy of Sciences, U.S.A.," vol. 47, No. 11, pp. 1791–1795 (November 1961).

Kaczmarczylk et al.: "Proceedings of the National Academy of Sciences, U.S.A.," vol. 48, pp. 729–733 (May 1962).

MILTON WEISSMAN, *Primary Examiner.*

MAURICE A. BRINDISI, *Examiner.*

OSCAR R. VERTIZ, *Assistant Examiner.*